United States Patent
Marchal et al.

(10) Patent No.: US 10,569,489 B2
(45) Date of Patent: Feb. 25, 2020

(54) COMPACTING ASSEMBLY AND METHOD OF FABRICATING A COMPOSITE BLADE FOR A TURBINE ENGINE

(71) Applicant: SNECMA, Paris (FR)

(72) Inventors: Yann Marchal, Moissy-Cramayel (FR); Matthieu Gimat, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 688 days.

(21) Appl. No.: 15/026,282

(22) PCT Filed: Oct. 3, 2014

(86) PCT No.: PCT/FR2014/052515
§ 371 (c)(1),
(2) Date: Mar. 31, 2016

(87) PCT Pub. No.: WO2015/049475
PCT Pub. Date: Apr. 9, 2015

(65) Prior Publication Data
US 2016/0243777 A1 Aug. 25, 2016

Related U.S. Application Data (60) Provisional application No. 61/886,725, filed on Oct. 4, 2013.

(30) Foreign Application Priority Data

Jun. 27, 2014 (FR) .................................. 14 56021

(51) Int. Cl.
*B29C 70/48* (2006.01)
*B29D 99/00* (2010.01)
(Continued)

(52) U.S. Cl.
CPC .......... *B29D 99/0025* (2013.01); *B29B 11/16* (2013.01); *B29C 43/006* (2013.01);
(Continued)

(58) Field of Classification Search
CPC ...................................................... B29C 70/48
See application file for complete search history.

(56) References Cited

U.S. PATENT DOCUMENTS 2,746,514 A 5/1956 Warnken
4,221,556 A 9/1980 Kiss
(Continued)

FOREIGN PATENT DOCUMENTS

CN 1951664 A 4/2007
EP 1 777 063 A1 4/2007
(Continued)

OTHER PUBLICATIONS

First Office Action and Search Report and English language translation issued in corresponding CN Application No. 201480055009.0 dated Apr. 18, 2017 (23 pages).
(Continued)

*Primary Examiner* — Ryan M Ochylski
(74) *Attorney, Agent, or Firm* — Bookoff McAndrews, PLLC (57) ABSTRACT

Compacting assembly comprising a shaper mold (24) defining an upwardly open housing suitable for receiving a woven preform (10a) that has previously been cut out, and a vertically movable compacting tool (128) that, together with the shaper mold (24), forms a compacting assembly for compacting said preform previously placed in the housing. The compacting tool (128) comprises at least a root portion (128A). The invention is applicable to fabricating turbine engine composite blades.

7 Claims, 4 Drawing Sheets

(51) Int. Cl.
- *B29C 70/24* (2006.01)
- *B29B 11/16* (2006.01)
- *B29C 43/00* (2006.01)
- *B29C 45/00* (2006.01)
- *F01D 5/28* (2006.01)
- *B29L 31/08* (2006.01)

(52) U.S. Cl.
CPC .......... *B29C 45/0005* (2013.01); *B29C 70/24* (2013.01); *B29C 70/48* (2013.01); *F01D 5/282* (2013.01); *B29L 2031/08* (2013.01); *F05D 2220/36* (2013.01); *F05D 2230/20* (2013.01); *F05D 2240/30* (2013.01); *F05D 2300/6034* (2013.01)

(56) References Cited

U.S. PATENT DOCUMENTS

| | | |
|---|---|---|
| 5,013,216 A | 5/1991 | Bailey et al. |
| 5,672,417 A | 9/1997 | Champenois et al. |
| 2005/0084377 A1 | 4/2005 | Dambrine et al. |
| 2012/0223456 A1* | 9/2012 | Patrigeon ................ B29C 70/48 264/265 |
| 2012/0267039 A1 | 10/2012 | Dambrine et al. |
| 2014/0203468 A1* | 7/2014 | Humphries ............. C04B 26/14 264/71 |

FOREIGN PATENT DOCUMENTS

| | | |
|---|---|---|
| FR | 2 861 143 A1 | 4/2005 |
| FR | 2 892 339 A1 | 4/2007 |
| FR | 2 950 286 A1 | 3/2011 |

OTHER PUBLICATIONS

English Translation of Search Report dated Dec. 23, 2014, in corresponding International PCT Application No. PCT/FR2014/052515, filed on Oct. 3, 2014 (2 pages).

* cited by examiner

COMPACTING ASSEMBLY AND METHOD OF FABRICATING A COMPOSITE BLADE FOR A TURBINE ENGINE

CROSS-REFERENCE TO RELATED APPLICATIONS

This application is the U.S. national phase entry under 35 U.S.C. § 371 of International PCT Application No. PCT/FR2014/052515, filed on Oct. 3, 2014, which claims priority to French Patent Application No. FR 1456021, filed on Jun. 27, 2014, and to U.S. Provisional Patent Application No. 61/886,725, filed Oct. 4, 2013, the entireties of each of which are incorporated by reference herein.

TECHNICAL FIELD

The present disclosure relates to a compacting assembly and to a method of fabricating a composite blade for a turbine engine, as well as a composite blade for a turbine engine. The composite blade may be a blade of the type comprising a preform made of three-dimensionally woven yarns or fibers and a binder holding the relative positioning between the yarns of the preform. Said preform may be made up of warp yarns and of weft yarns, with the direction of the warp yarns forming the longitudinal direction of the preform.

In particular, the present method relates to fabricating a fan blade for a turbine engine, in particular a turbojet. Nevertheless, it is also envisaged to fabricate a blade for use in a low pressure compressor, where the temperatures reached in operation are compatible with the high temperature strength of this type of blade. It is also envisaged to fabricate blades for an unducted (or "open rotor") fan or indeed blades having platforms incorporated therein.

BACKGROUND

In conventional manner, fan blades made out of composite material, in particular out of carbon fibers, are made from a stack of pre-impregnated unidirectional plies that are placed in a mold with the successive plies having different orientations, prior to compacting and polymerizing in an autoclave. That technique is very difficult and requires ply-stacking operations to be performed manually, which is lengthy and expensive.

Proposals have also been made to prepare woven preforms of dry fibers that are subsequently assembled together by stitching, prior to being impregnated by injecting resin into a closed mold. An alternative has consisted in making a single woven preform that is assembled together with one or more solid inserts prior to injection. Those solutions (patent documents U.S. Pat. Nos. 5,672,417 and 5,013,216) nevertheless present the drawbacks of requiring a plurality of parts to be assembled together and of creating within such assembly zones sites that are particularly likely to be weak, e.g. as a result of delamination, which is very harmful in terms of mechanical strength, in particular for ability to withstand impacts.

In order to overcome those drawbacks, patent document FR 2 861 143 proposes making a preform out of three-dimensionally woven yarns or fibers making it possible on its own, possibly after being cut out and having a binder injected therein, to form the final part forming all the portions of the turbine engine blade, without having recourse to inserts or any other fitted element.

In particular, use is made of the fabrication method described in patent document FR 2 892 339, during which the woven and then cut-out preform is put into place in a mold prior to injecting the binder and then proceeding its hardening.

Nevertheless, at present, various problems remain associated with the way in which the shaping is implemented.

GENERAL SUMMARY

The present disclosure relates to a compacting assembly making it possible to avoid the above-mentioned drawbacks. In particular, the compacting assembly makes it possible to perform pre-compacting of the preform.

The compacting assembly may be used on a preform obtained by three-dimensionally weaving yarns in order to form a composite blade for a turbine engine, said preform comprising simultaneously the airfoil, the root of the blade, and between the airfoil and the root, the tang of the blade.

The compacting assembly comprises a shaper mold defining an upwardly open housing for receiving a woven preform (which may previously have been cut out), and a vertically movable compacting tool that co-operates with the shaper mold in order to form a compacting assembly enabling said preform to be compacted when it is placed in the housing.

The compacting assembly may define a longitudinal direction and a vertical midplane parallel to the longitudinal direction.

The compacting tool may be configured to move down towards the shaper mold.

The compacting tool has at least a root portion. By way of example, the compacting tool may comprise only a root portion, or it may comprise both a root portion and a tang portion. Under such circumstances, the root and tang portions may form a single block, or on the contrary they may be separate from each other. When they are separate, the tang portion may itself be subdivided into at least three separate compacting blocks, including a central compacting block, said compacting blocks being configured to move down towards the shaper mold in independent manner. In particular, the compacting blocks may be lowered in sequential manner, beginning with the central compacting block.

The present disclosure also relates to a method of fabricating a composite blade for a turbine engine by making use of a compacting assembly, and it also relates to a composite blade for a turbine engine.

BRIEF DESCRIPTION OF THE DRAWINGS

Other advantages and characteristics of the invention appear on reading the following description made with reference to the accompanying drawings, in which.

DETAILED DESCRIPTION OF EMBODIMENTS

Embodiments are described in detail below with reference to the accompanying drawings. These embodiments show the characteristics and the advantages of the invention. Nevertheless, it should be recalled that the invention is not limited to these embodiments.

In an embodiment, the method of fabrication begins with a first step a) consisting in making a three-dimensional preform by weaving, the woven preform comprising warp yarns 20a and weft yarns 20b. These two groups of yarns include tracer yarns 22 that can be distinguished visually from the other yarns and that are situated regularly, at least at the surface of the preform.

By way of example, the warp and weft yarns may be taken from the group consisting of carbon fibers, glass fibers, silica fibers, silicon carbide fibers, alumina fibers, aramid fibers, and aromatic polyamide fibers.

The preform that is woven as a single piece is then cut in a second step b) of the method. More exactly, the woven preform is cut out by cutting around an outline based on a predetermined three-dimensional jig that is designed so that, after being deformed, the preform matches the shape of the finished part. This cutting may be performed using a water jet and/or by mechanical means (scissors, cutter, saw, . . . ), and/or by laser cutting.

Figure 1:
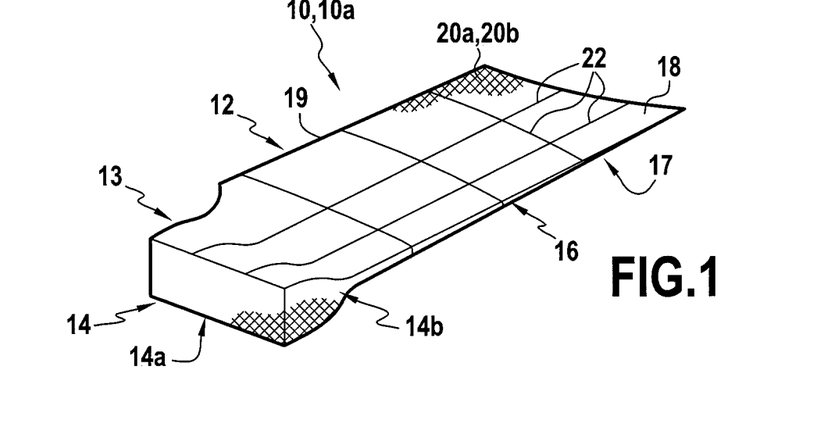
FIG. 1 is a general view in perspective of an example preform, after being cut out.

This leads to a cut-out preform 10a as shown in FIG. 1. The portions that are to form the airfoil 12 and the root 14 of the blade together with the tang 13 which is the transition portion between the airfoil 12 and the root 14 can be seen. In particular, the warp yarns 20a and the weft yarns 20b used for three-dimensional weaving are carbon fibers (black), with glass or Kevlar fibers (white) forming tracer yarns 22 that are situated essentially at the surface of the preform along the main longitudinal direction parallel to the warp yarns 20a and along the transverse direction parallel to the weft yarns 20b. In this way, the tracer yarns 22 appear to be white in color on the remainder of the preform, which is black, and the tracer yarns 22 are thus highly visible. Furthermore, the tracer yarns are detectable by conventional non-destructive inspection technologies (of the X-ray tomography or ultrasound type) for verifying that the final part is in compliance.

In particular, the tracer yarns 22 are shown in this example as being at the surfaces of two faces (that are respectively to form the pressure side wall 17 and the suction side wall 18) of the blade at predetermined locations so as to act as reference points for positioning purposes prior to the cutting step and prior to other steps of processing the preform, as explained below.

During the cutting step, provision is made to conserve a series of tracer yarns 22 situated at the surface of the preform along at least one reference face 16, which in the example shown is the face that is to form the leading edge.

Thereafter, the cut-out preform 10a is subjected to pre-deformation during a step c).

In particular, during the step c), said pre-deformation is performed by placing the cut-out preform 10a in a shaper mold 24 (FIG. 2) presenting various portions that between them define a cavity (housing 26) that is to receive the cut-out preform 10a and presenting marks that are used as references for positioning at least some of the tracer yarns 22.

Various systems may be used for identifying and positioning the cut-out preform 10a, in particular a laser projector 27 (see FIG. 2) that projects a light beam onto the ideal location for a tracer yarn 22 so that it is easy to move the corresponding tracer yarn 22 accordingly in order to obtain the predetermined positioning.

Alternatively, or in addition, masks reproducing the outline and/or the position of some or all of the tracer yarns 22 may be arranged on the preform in order to verify that it is properly positioned.

When the cut-out preform 10a is placed in the shaper mold 24, the cut-out preform 10a is put into a configuration that deforms it by applying a rotation (arrow 25a in FIG. 2) about an axis XX' parallel to its main direction, thereby having the effect of twisting the airfoil about this axis.

In some embodiments, provision may also be made for the shaper mold 24 to present a movable portion 24a that is slidable intended to take up a position against the free end of the root 14 of the preform in order to exert stress (arrow 25b in FIG. 2) that imparts the desired deformation for this portion 14 of the preform, or that avoids certain types of deformation in this portion, while deformation is being imparted to other portions of the preform 10b.

It should be understood that numerous different possibilities can be envisaged for shaping the cut-out preform 10a by using tracer yarns 22 as reference elements for positioning the preform 10a in the shaper mold 24.

The strategy of placing the cut-out preform 10a in the shaper mold 24 is also associated with the previously performed cutting or cutting-out profile depending on the selected reference surface(s), in particular surfaces selected from the root, the tip, the leading edge 16, the trailing edge 19, or any other predetermined zone.

Putting the cut-out preform 10a in the shaper mold 24 may suffice to impart all of the deformation needed to achieve the desired final shape. Nevertheless, in some embodiments, it is also possible to perform step c) at a plurality of substeps.

Thereafter, a binder is injected into said injection mold, the binder comprising a thermosetting resin and serving to impregnate the entire preform and to maintain the relative positioning between the yarns of the preform; thereafter the injection mold is heated; and the composite molded part presenting substantially the shape and the dimensions of said blade is then extracted from the mold.

In a step d) that follows step c) and prior to injecting the binder, at least a portion of the pre-deformed preform 10b is subjected to pre-compacting, which portion comprises the root and preferably the root 14 and the tang 13, the pre-compacting being applied over the entire width of the pre-deformed preform 10b. This pre-compacting blocks certain fibers in desired positions, or at least limits the movement available thereto, thereby obtaining an intermediate shape for the preform that is even closer to the desired final shape. Blocking the fibers of the root and preferably also the fibers of the tang serves to guarantee better positioning of the fibers in the blade as fabricated and makes it possible in particular to limit the phenomenon of fibers buckling as is commonly observed these the portions of the blade. In turn, properly positioning the fibers makes it possible to obtain good mechanical properties in the root and the tang of the blade. Such an effect is particularly advantageous because the root and the tang are the portions of the blade that are subjected to the greatest mechanical stresses in operation.

Figure 2:
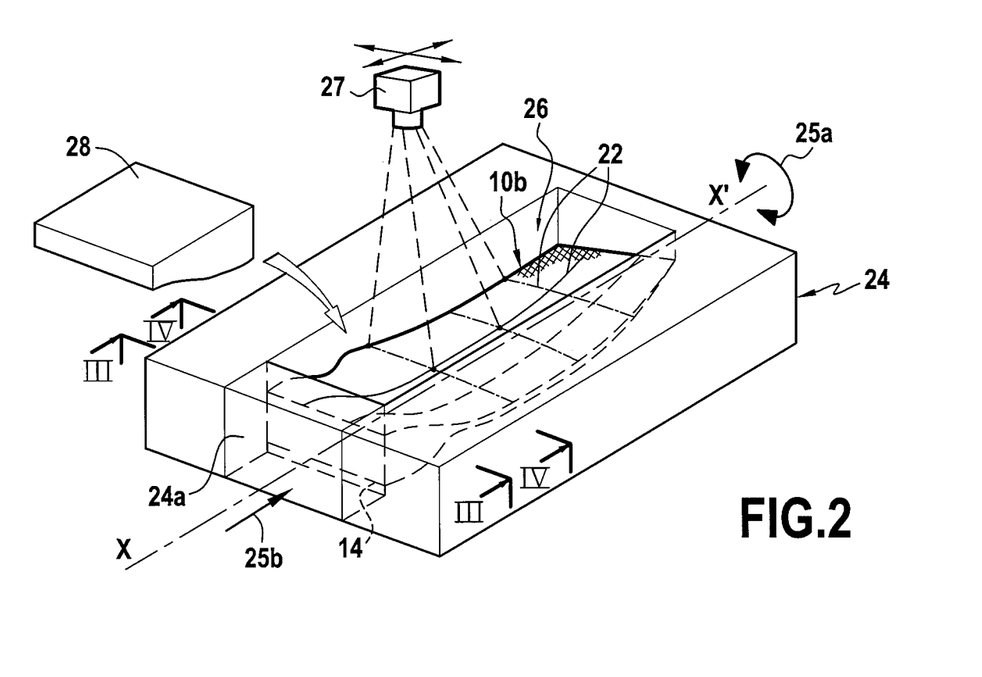
FIG. 2 shows a manufacturing step in an example method of fabrication.

The compacting tool 28 that is used for this purpose, shown schematically and in part in FIG. 2, may be made so as to finish off the shaper mold 24 with the necessary equipment. The compacting tool 28 is movable (up and down) and must be capable of being raised to a temperature of about 100° C.

During this step d), it is the lubricating substances coating the yarns and that are used for facilitating weaving that serve to block the relative positions of the fibers in the pre-compacted portion.

Thereafter, the pre-compacted preform 10c is wetted and then dried, e.g. in a drying oven, so as to obtain a stiffened preform. This stiffening serves to "freeze" the shaping imparted during step c) to the cut-out preform 10a, now the pre-deformed preform 10b, and to do so sufficiently to enable it subsequently to be placed in the injection mold 24 easily and without significantly changing its shape, which corresponds to the shape of the above-mentioned pre-deformation.

If necessary, it is possible to add a tackifying agent inside the preform, e.g. a dilute resin, in particular of the epoxy type, for the purpose of being able, under the effect of the heat and pressure that are exerted during the pre-compacting step d), to stick together the woven carbon fibers in order to avoid the pre-deformed preform 10b being subjected to any subsequent deformation, in particular during the injection step.

The compacting tool 28 presents a shape and dimensions that enable it to be inserted in the housing 26 of the shaper mold 24 in order to compact the woven preform to a fiber density that is intermediate relative to the final fiber density of the final part. For example, using the compacting tool 28, the idea is to obtain a compacted preform presenting a fiber density in the range 35% to 55% such that, after injection, the final part presents a fiber density lying in the range 50% to 65%.

Figure 3:
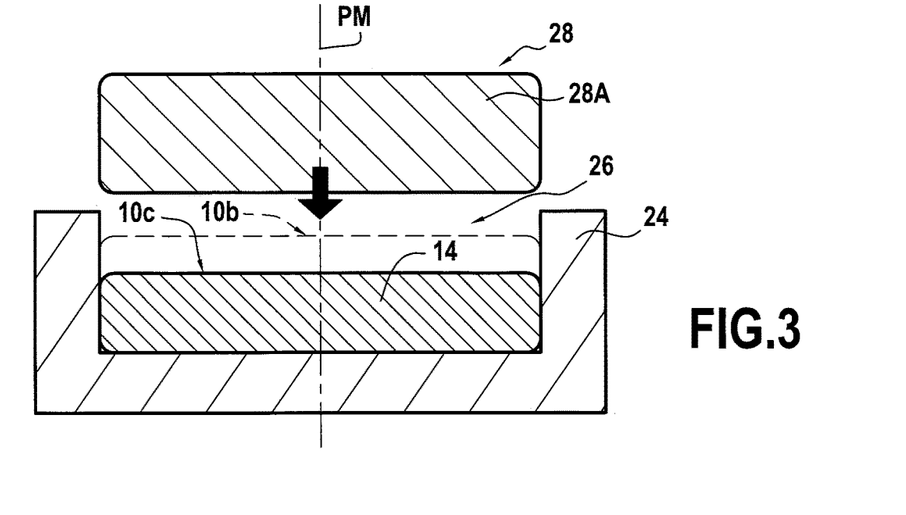
FIGS. 3 and 4 are section views on directions III and IV of FIG. 2 showing the effect of the compacting on the profiles of two different portions of the preform, using a compacting assembly in a first embodiment of the invention.
Figure 4:
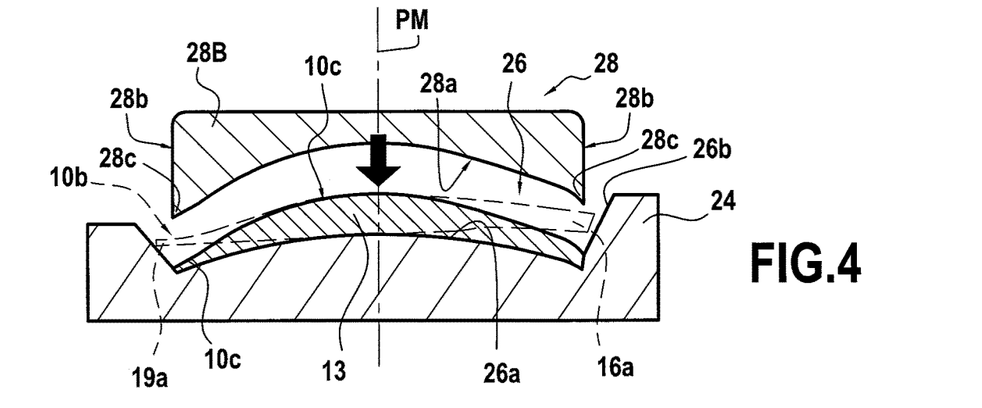

Reference is made to FIGS. 3 and 4, which are cross-sections of a compacting assembly in an embodiment (shaper mold 24 and compacting tool 28) and of the pre-deformed preform 10b showing its root 14 (FIG. 3) and its tang 13 (FIG. 4), so as to show how the pre-deformation is applied to these different portions 13 and 14 of the pre-deformed preform 10b (dashed lines) in order to obtain the compacted preform 10c (continuous lines).

For the root 14 (FIG. 3), the housing 26 of the shaper mold 24 presents a rectangular section and the compacting tool 28 presents a root portion 28A of rectangular section that is complementary to the section of the housing 26.

For the tang 13 (FIG. 4), the housing 26 of the shaper mold 24 presents a section with a convex bottom 26a and sides 26b that flare towards the opening of the housing 26. The compacting tool 28 presents a tang portion 28B of section that has sides 28b that are substantially vertical and a bottom 28a that is to face the convex bottom of the shaper mold 24. This bottom 28a is concave with a profile that presents radii of curvature that are greater than the convex profile of the bottom of the housing 26 of the shaper mold 24.

The compacting tool 28 in this embodiment is a single piece such that when moved it moves down (or up) into (or away from) the housing 26 of the shaper mold 24, thereby compressing the pre-deformed preform 10b.

In order to avoid damaging the fibers of the pre-deformed preform 10b, and in particular in order to avoid pinching them, the surfaces of the shaper mold 24 and of the compacting tool 28 that face towards the housing do not present any (projecting or re-entrant) sharp edges, but are constituted by faces with corners that are rounded by smooth connections forming fillets.

In such a situation, when the compacting tool 28 moves down, and giving consideration to the tang portion 28B that compacts the tang 13 of the preform (FIG. 4), it is initially the side edges 16a and 19a of the pre-deformed preform 10b, which edges are to form respectively the leading edge 16 and the trailing edge 19, that come into contact with the compacting tool 28 at the locations of its side edges 28c and bottom 28a. Thereafter, contact is made progressively with the entire surface of the tang 13 facing towards the compacting tool 28, ending with the central zone (strip) of this surface, which central zone passes through a midplane PM of the compacting assembly.

This midplane PM, which is not necessarily a plane of symmetry for the compacting assembly or for the preform, is vertical, parallel to the axis XX' oriented in the main direction of the preform, and lies halfway both between the side edges 26b of the housing 26 of the shaper mold 24 and also between the side edges 28b of the compacting tool 28.

Figure 5:
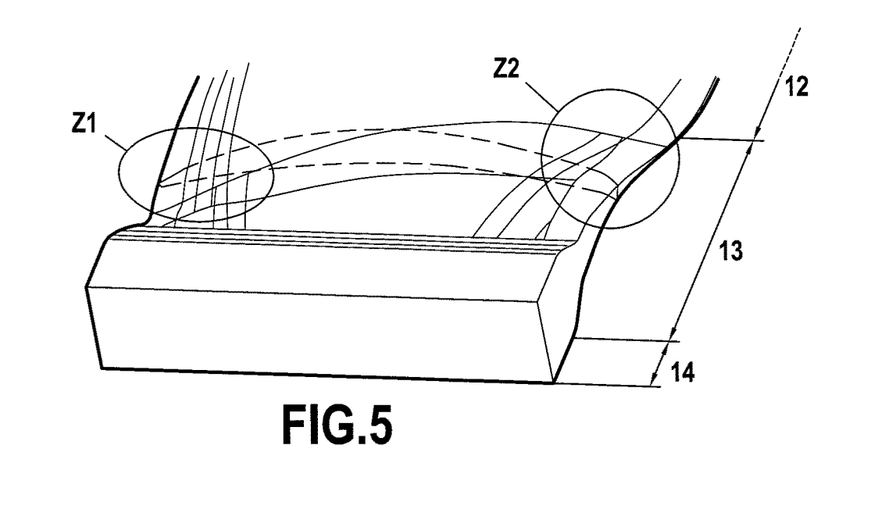
FIG. 5 is a fragmentary view of the preform of FIG. 1, showing the root and the tang in enlarged manner.

This configuration may sometimes have certain drawbacks concerning the pre-deformation of the tang 13: thus, in the configuration shown in FIG. 5, since the side edges 16a and 19a of the pre-deformed preform 10b are both thinner and also subjected to more bending than the remainder of the tang, the fibers 20 forming the preform are subjected to buckling, which can be harmful to good mechanical strength in the final blade.

The zones of the cut-out preform 10a that are subjected to this undesirable buckling are shown in FIG. 5 in two locations Z1 and Z2 corresponding to the fine edges of the tang 13 situated close to the airfoil 12.

In order to overcome the above-mentioned drawbacks, in one embodiment, the compacting tool may include at least three separate compacting blocks, including a central compacting block crossing said midplane, together with two side compacting blocks situated on either side of said compacting tool, said compacting blocks being suitable for being lowered one by one towards the shaper mold in independent manner, beginning with the central compacting block.

In this way, the compacting tool may be made up of at least three portions, and it is possible to lower these portions at different moments, beginning with the central compacting block, which is lowered first so that initial contact between the compacting tool and the cut-out preform takes place via the central zone of the surface of the tang that faces towards the compacting tool.

In this way, by means of the compacting assembly of the invention, the side edges of the tang of the preform are compacted last, thereby making it possible to minimize or even avoid fiber buckling in these thin zones during the pre-compacting.

In particular, the compacting tool may have an odd number of separate compacting blocks so as to form a configuration with a central compacting block crossing said midplane and, on either side of the central compacting block, identical numbers of other compacting blocks.

A multiblock compacting tool also presents the advantage of making it possible to vary the amount of pre-compacting imparted by each of the compacting blocks on the preform, where this can be measured by the intermediate fiber density that results from the pre-compacting.

In certain embodiments, said compacting blocks are suitable for being lowered one by one towards the shaper mold in an order that serves to compact the entire width of said preform beginning by said central compacting block followed by each compacting block adjacent to a previously lowered block, and so on to the side compacting block.

In certain embodiments, said compacting tool has at least a root portion and a tang portion, and the tang portion has at least three separate compacting blocks. The root portion may be multiblock or single block. When the root portion is multiblock, it may be subdivided into at least three separate compacting blocks, including a central compacting block.

In certain embodiments, said compacting blocks are suitable for moving down towards the shaper mold, beginning with the central compacting block, followed by all of the compacting blocks on one of the sides of the midplane, preferably one by one and one after another starting from the central compacting block and going to the first side compacting block, and finally all of the compacting blocks on the other side of the midplane, preferably one by one, starting from the block closest to the central compacting block and going to the second side compacting block.

In an alternative possibility, said compacting blocks are suitable for moving down towards the shaper mold in symmetrical manner about the midplane.

In some embodiments, the entire compacting tool 128 is subdivided into at least three separate compacting blocks, including a central compacting block $128_1$ passing through the midplane PM of the compacting tool 128, said compacting blocks being arranged to be moved down towards the shaper mold 24 in independent manner, beginning with the central compacting block $128_1$.

The compacting tool 128 may include the transition zone between the root 14 and the airfoil 12, i.e. the tang 13, with this being for the purpose of controlling the deformation imparted by the compacting in this transition zone. For this purpose, the tang portion 128B of the compacting tool 128 may rise within the tang 13 up to a height of more than 50 millimeters (mm), and preferably about 70 mm above the bearing surfaces 14b (see FIG. 1).

Figure 6:
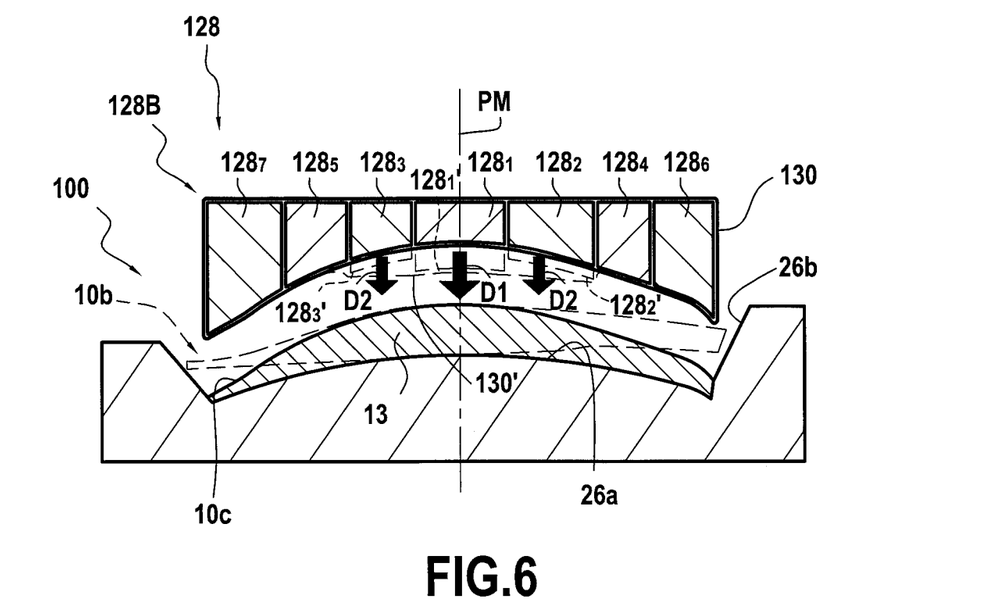
FIG. 6 is a section view analogous to that of FIG. 4, showing another example of a compacting assembly.
Figure 7:
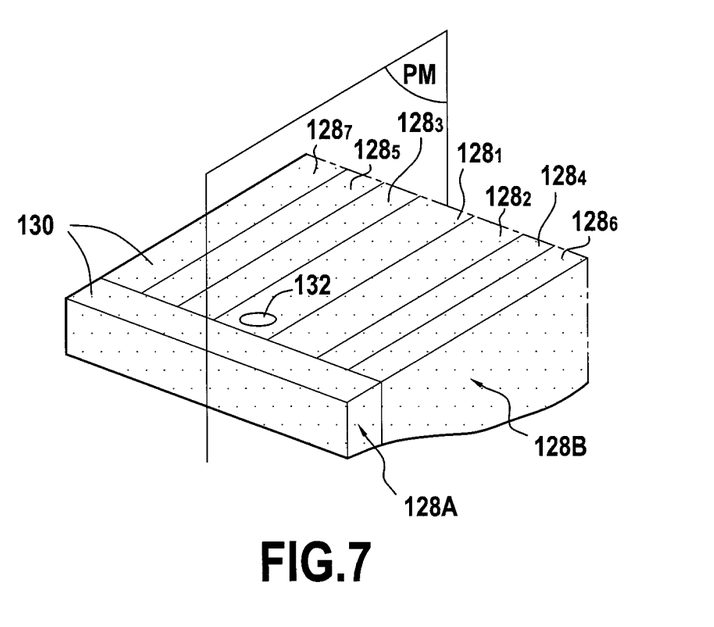
FIG. 7 is a perspective view of the compacting tool of the compacting assembly of FIG. 6.

In the example of FIGS. 6 and 7, the compacting tool 128 has a root portion 128A and a tang portion 128B that are separate. The root portion 128A and the tang portion 128B thus constitute independent portions of the compacting tool.

In particular, and as shown, the root portion 128A may be a single block while the tang portion 128B may comprise at least three separate compacting blocks including a central compacting block $128_1$ passing through the midplane PM of the compacting tool 128, said separate compacting blocks of the tang portion 128B being suitable for being lowered independently towards the shaper mold 24, beginning with the central compacting block $128_1$. In this example, the tang portion 128B of the compacting tool 128 is subdivided into seven separate compacting blocks $128_1$, $128_2$, $128_3$, $128_4$, $128_5$, $128_6$, and $128_7$, that are distributed on both sides of the midplane PM.

In this way, the downward movement of the compacting tool 128 can be split up. For example, the root portion 128A and the tang portion 128B can be lowered independently. The tang portion 128B can be lowered beginning with the central compacting block $128_1$ passing through the midplane PM of the compacting tool 128 (down arrow D1 and dashed line $128_1'$ in FIG. 6), followed by the two compacting blocks $128_2$ and $128_3$ situated on either side of the central compacting block $128_1$ (down arrows D2 and D3 and dashed lines $128_2'$ and $128_3'$ in FIG. 6), and so on all the way to the two side compacting blocks $128_6$ and $128_7$ situated at the outsides of the compacting tool 128.

In this embodiment, the downward movement of the single root block constituting the root portion 128A may, by way of example, be initiated prior to beginning to lower the central compacting block $128_1$ of the tang portion 128B, or simultaneously with the beginning of lowering the central compacting block $128_1$ of the tang portion 128B, and it may be lowered at a speed that is the same as or different from the speed of the central compacting block $128_1$ of the tang portion 128B.

In another possibility, the downward movement of the single root block constituting the root portion 128A may be performed in full prior to beginning to lower the central compacting block $128_1$ of the tang portion 128B: this makes it possible to block the root prior to applying any manipulation to the remainder of the preform.

This embodiment makes it possible to manage the shape imparted to the root 14 of the pre-deformed preform 10c by means of the shape of the bottom face of the root block 128A and by means of the amount of compaction it applies, by adjusting the force it exerts in its lowest position, in a manner that is independent to the forces exerted by the tang block 128B: this configuration makes it easier to obtain a satisfactory amount of compaction of the bearing surfaces (side faces of the root 14) in the final part.

In addition, by blocking the fibers of the root 14 in position (or at least by limiting their possibilities of moving) by means of the root block 128A, prior to compacting the tang 13 with the tang block 128B, further improves the positioning of the fibers in the blade as fabricated. This aspect associated with lowering the compacting blocks $128_1$ to $128_7$ towards the shaper mold in independent manner, beginning with the central compacting block, significantly reduces the undesirable phenomenon of buckling in the zones Z1 and Z2 as identified in FIG. 5 and corresponding to the fine edges of the tang 13 that are situated in the proximity of the airfoil 12. The comparative views of FIGS. 8 and 9 show this result.

Figure 8:
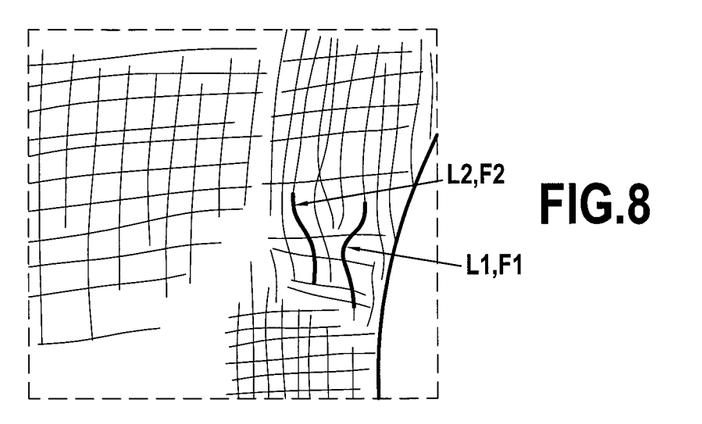
FIGS. 8 and 9 are comparative schematic views of composite blade portions, the blades being fabricated differently.
Figure 10:
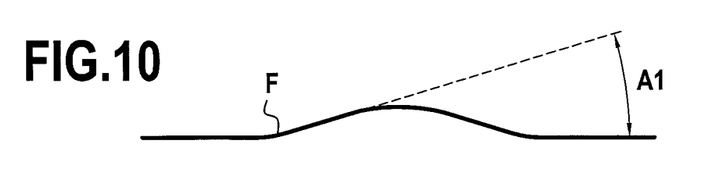
FIGS. 10 and 11 show how to measure the deflection angle of two fibers having two typical buckling configurations.
Figure 11:
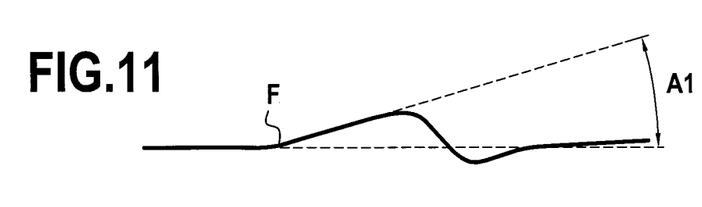

The view of FIG. 8 shows a composite blade having a three-dimensionally woven preform impregnated with a binder, the binder maintaining the relative positioning between the fibers of the preform. The blade was fabricated using the method described below, starting with a preform pre-compacted using a single block compacting tool 28 of the kind shown in FIG. 2. The outer layer of the woven preform can be seen in FIG. 8. The zone of the blade that is shown in FIG. 8 corresponds to the zone Z1 identified in FIG. 5, i.e. the zone of the tang 13 that runs along the leading edge and that is adjacent to the airfoil 12. In this zone Z1, the edge of the tang 13 is particularly fine. Several marks are drawn on the surface shown of the preform 10, including lines L1 and L2. These lines L1 and L2 are drawn respectively along two fiber portions F1 and F2 of the outer layer of the woven preform 10. The main direction of the fibers F1, F2 is substantially vertical in FIG. 8. The lines L1 and L2, which show the paths followed locally by the two fiber portions F1 and F2 are curved, thereby illustrating the fact that the fibers F1 and F2 depart locally from their main directions. This phenomenon is referred to as "buckling" of the fibers F1 and F2. Buckling is quantified by measuring the deflection angles A1 of the fibers F1 and F2. FIGS. 10 and 11 show respectively how this angle A1 is measured for two fibers F in different typical buckling configurations. In the buckling shown in FIG. 8 by the lines L1 and L2, the deflection angles A1 of the fibers F1 and F2 are at least 30°.

Figure 9:
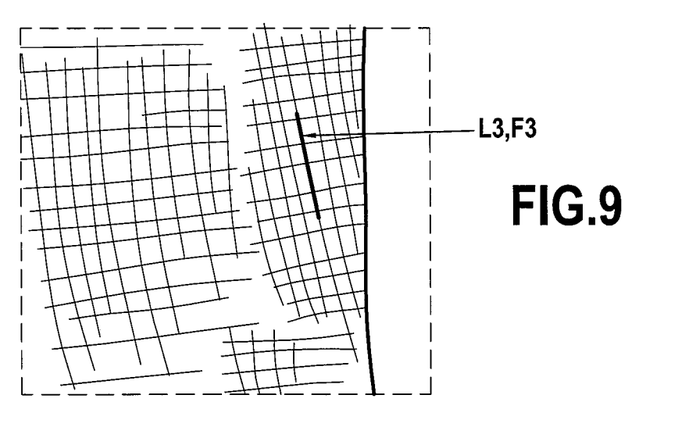

FIG. 9 is a view analogous to that of FIG. 8 showing a composite blade comprising a three-dimensionally woven preform impregnated with a binder. The blade was fabricated using the same method as was used for FIG. 8, with the exception of the step of pre-compacting the preform 10. In this example, the preform 10 was pre-compacted using a compacting tool 128 of the kind shown in FIG. 7. The outer layer of the woven preform can be seen in FIG. 9. The zone of the blade shown in FIG. 9 corresponds to the zone Z1 shown in FIG. 5. A line L3 is drawn along a portion of a fiber F3 forming part of the outer layer of the preform 10. It can be seen that there is no buckling, or at least that the fiber F3 and all of the adjacent fibers situated in the zone Z1 present limited buckling. In particular, it can be seen that the deflection angles A1 of the fibers in this zone Z1 are less than 20°, and more particularly less than 5°. Similar observations have been made in the zone Z2 shown in FIG. 5, i.e. in the zone of the tang 13 that runs along the trailing edge and that is adjacent to the airfoil 12.

In certain embodiments, the compacting tool 128 also has a deformable skin 130 (e.g. a thick film of silicone) that covers at least the entire face of said tang portion 128B of the compacting tool 128 that is to face the shaper mold 24.

In the example of FIG. 6, this deformable skin 130 covers practically all of the compacting tool 128.

In a variant that is not shown, this skin covers only the tang portion 128B of the compacting tool 128, or only the portion of said tang portion 128B of the compacting tool 128 that faces towards the shaper mold 24, or indeed all of the faces of said tang portion 128B.

As can be seen in FIG. 6, with such a flexible skin 130, it is possible to avoid impeding the progressive downward movement of the separate compacting blocks $128_1$, $128_2$, $128_3$, $128_4$, $128_5$, $128_6$, and $128_7$, because of the reversible stretching and deformation of the skin 130 (see the deformed shape 130' of the skin), while avoiding pinching weft yarns 20a or warp yarns 20b of pre-deformed preform 10b.

As shown in FIG. 7, and optionally, the compacting tool 128 includes at least one window 132 making it possible to view the position of at least one tracer yarn while the preform is placed in the housing defined between the shaper mold 24 and the compacting tool 28. By way of example, this window 132 is constituted by a portion of the compacting tool 128 that is made of transparent material, or preferably it is constituted by an opening passing through the entire thickness of the compacting tool 28. This window 132 may be located in a zone of the tang portion 128B that is adjacent to the root portion 128A, preferably in the central compacting block $128_1$. Such a window 132 makes it possible in particular to verify that the tracer yarn(s) 22 visible in the window (e.g. the tracer yarn at the outlet from the bearing surface) is/are properly positioned and remain(s) properly positioned during the compacting operation.

In the example shown in FIG. 6, the tang portion 128B of the compacting tool 128 is subdivided into seven separate compacting blocks $128_1$, $128_2$, $128_3$, $128_4$, $128_5$, $128_6$, and $128_7$.

The compacting blocks $128_1$, $128_2$, $128_3$, $128_4$, $128_5$, $128_6$, and $128_7$ can thus move down to compact the preform 10b at different speeds and/or with different forces being exerted by the compacting blocks on the preform, thereby giving rise to different levels of pre-compacting or in the intermediate fiber density resulting from the pre-compacting imparted by the various compacting blocks $128_1$, $128_2$, $128_3$, $128_4$, $128_5$, $128_6$, and $128_7$.

In the example shown, there are seven compacting blocks $128_1$, $128_2$, $128_3$, $128_4$, $128_5$, $128_6$, and $128_7$ for the tang portion 128B, however, more generally, it is possible to provide at least five, e.g. exactly five, and this may apply regardless of whether the subdivision into separate compacting blocks relates to the (unitary) assembly formed by the tang portion 128B of the compacting tool 128 and the root portion 128A of the compacting tool, or only to the tang portion 128B of the compacting tool 128.

A method of fabricating a composite turbine engine blade may comprise the following steps:

a) making a preform 10 by three-dimensional weaving of yarns 20a, 20b, 22, said preform comprising simultaneously the airfoil 12, the root 14 of the blade, and between the airfoil 12 and the root 14, the tang 13 of the blade, the yarns 20 including visibly identifiable tracer yarns 22 arranged at least at the surface of the preform;

b) cutting out said preform while leaving intact a series of tracer yarns 22 situated along a reference face 16 of the preform, thereby providing a cut-out preform 10a suitable for taking on the shape and the dimensions of portions constituting the blade;

c) pre-deforming said cut-out preform 10a, thereby providing a pre-deformed preform 10b;

d) pre-compacting said pre-deformed preform 10b, thereby providing a pre-compacted preform 10c;

e) wetting the pre-compacted preform 10c and drying it, e.g. in a drying oven, thereby providing a stiffened preform 10;

f) providing an injection mold 24 in which said stiffened preform 10 is placed;

g) injecting a binder comprising a thermosetting resin into said injection mold in order to impregnate the entire stiffened pre-deformed preform 10 and maintain the relative positioning between the yarns 20a, 20b, 22 of the stiffened preform;

h) heating said injection mold; and i) extracting from the mold a composite molded part having substantially the shape and the dimensions of said blade.

During step c), said pre-deformation step is performed by placing the cut-out preform 10a in the housing 26 defined by a shaper mold 24, and during step d), said pre-compacting of said pre-deformed preform 10b is performed by using a movable pre-compacting tool 128 that co-operates with the shaper mold 24 in order to form a compacting assembly defining a longitudinal direction and a vertical midplane PM parallel to the longitudinal direction.

During step d), the compacting tool 28 can be moved down towards the shaper mold 24.

When the compacting tool 128 comprises a plurality of compacting blocks $128_1$, $128_2$, $128_3$, $128_4$, $128_5$, $128_6$, and $128_7$, as described above, the compacting tool 128 is suitable during step d) for compacting at least the root 14 of said pre-deformed preform 10b, beginning with the middle and going progressively to the edge of the pre-deformed preform 10b.

Likewise, when the compacting tool 128 has a root portion 128A and a tang portion 128B, as defined above, these portions 128A and 128B may be moved down separately towards the shaper mold 24.

Thus, by means of these advantageous provisions, during the compacting step fiber buckling is avoided in the root zone 14 and in the tang zone 13 of the preform, as shown in part by above-described FIGS. 8 and 9.

In this method, during step d), said compacting tool 128 is suitable for moving down towards the shaper mold 24 in such a manner that said compacting blocks move down one by one towards the shaper mold 24 in an order that compacts the entire width of said preform 10b beginning with its central portion passing through the midplane PM and followed by each portion adjacent to the preceding portion, moving progressively away from the midplane PM. During step d), said compacting tool 128 may be suitable for moving down towards the shaper mold 24 in a manner that is symmetrical about said midplane PM.

The figures show the example of a root 14 that remains rectilinear throughout the fabrication method. It should be understood that without going beyond the ambit of the present invention, it is possible to envisage a root that is twisted, or deformed in any other way, when it is placed in the shaper mold 24.

Furthermore, in a variant embodiment (not shown), the compacting tool 128 covers not only the root 14 and the tang 13 of the blade, but also a portion of the airfoil 12 of the blade.

Likewise, in the above description, it is stated that the compacting tool 128 performs a pre-compacting step, i.e. the step d). Nevertheless, it is also possible to use the compacting tool 128 alternatively as an element of the injection mold 24 and to use it only in steps f) and g). In another variant, it is possible to use the same compacting tool 128 not only in pre-compacting step d), but also in steps f) and g).

The verb "comprise", when used in the present application, should be understood as meaning that the specified characteristic is present, but without excluding the presence or the addition of one or more other characteristics.

The embodiments or implementations described in the present disclosure are given by way of non-limiting illustration, and the person skilled in the art can easily, in the light of this disclosure, modify these embodiments or implementations or can envisage others, while remaining within the ambit of the invention. Furthermore, the various characteristics of these embodiments or implementations may be used singly or in combination, the invention not being limited to the specific combinations described in the present disclosure.

What is claimed is:

1. A compacting assembly for compacting a woven preform obtained by three-dimensionally weaving yarns in order to form a composite blade for a turbine engine, said preform having portions for predefining the airfoil, the root of the blade, and between the airfoil and the root, the tang of the blade, the compacting assembly comprising a shaper mold defining an upwardly open housing suitable for receiving a woven preform, and a vertically movable compacting tool for co-operating with the shaper mold to form a compacting assembly enabling said preform to be compacted when it is placed in the housing, wherein the compacting tool comprises at least a root portion and at least one tang portion separate from the root portion, further comprising a deformable skin covering at least part of the compacting tool facing the shaper mold.

2. A compacting assembly according to claim 1, wherein the root portion and/or the tang portion is/are subdivided into at least three separate compacting blocks, including a central compacting block, said compacting blocks being configured to move down towards the shaper mold in independent manner, beginning with the central compacting block.

3. A compacting assembly according to claim 1, wherein the root portion is a single block and wherein the tang portion is subdivided into at least three separate compacting blocks.

4. A compacting assembly according to claim 1, wherein the deformable skin covers at least the entire surface of the tang portion facing the shaper mold.

5. A compacting assembly according to claim 1, wherein the compacting tool has at least one window configured to view the position of at least one tracer yarn when the preform is placed in the housing.

6. A method of fabricating a composite blade for a turbine engine, the method comprising the following steps:
   a) making a preform by three-dimensionally weaving yarns, said preform having portions defining the airfoil, the root of the blade, and between the airfoil and the root, the tang of the blade, the yarns including tracer yarns that are visually identifiable arranged at least at the surface of the preform;
   b) cutting out said preform while leaving intact a series of tracer yarns situated along a reference face of the preform, thereby obtaining a cut-out preform configured to predefine the shape and the dimensions of portions constituting the blade;
   c) pre-deforming said cut-out preform using the compacting assembly according to claim 1, thereby obtaining a pre-deformed preform;
   d) pre-compacting said pre-deformed preform using the compacting assembly according to claim 1, thereby obtaining a pre-compacted preform;
   e) wetting and drying the pre-compacted preform, thereby obtaining a stiffened preform;
   f) providing an injection mold in which said stiffened preform is placed;
   g) injecting a binder comprising a thermosetting resin into said injection mold in order to impregnate the entire stiffened preform and maintain the relative positioning between the yarns of the stiffened preform;
   h) heating said injection mold; and
   i) extracting from the mold a composite molded part presenting substantially the shape and the dimensions of said blade;
   wherein, during step c), said pre-deformation is performed by placing the cut-out preform in a housing defined by a shaper mold and in that, during step d), the pre-compacting is performed.

7. A method according to claim 6, wherein, during step d), at least the root portion of the preform is pre-compacted.

* * * * *